Nov. 18, 1952 A. BRÄM 2,618,728
APPARATUS FOR IRONING INSULATED COILS
Filed Nov. 29, 1950 2 SHEETS—SHEET 1
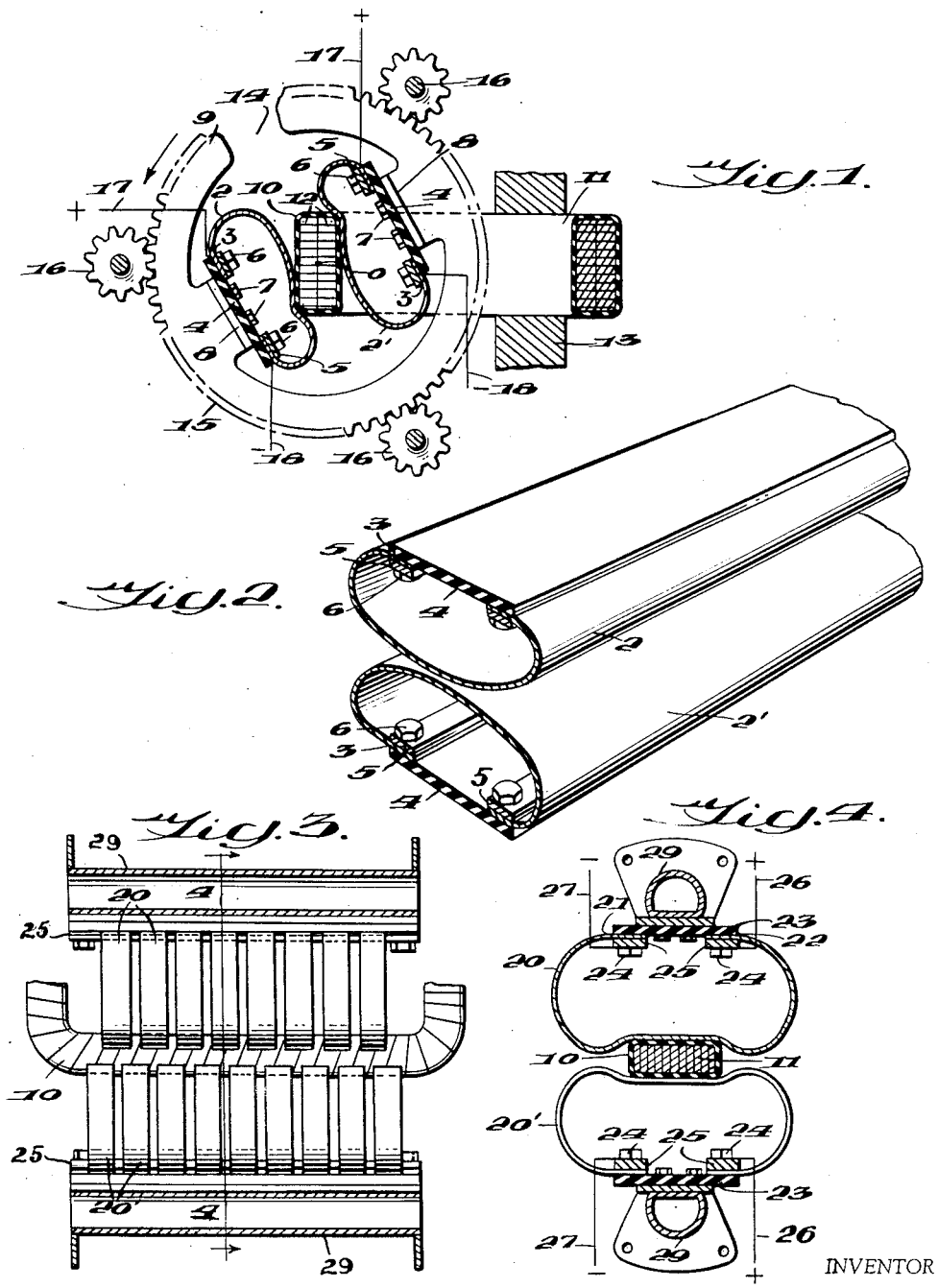
INVENTOR
Alfred Bräm
BY Pierce Scheffler & Parker
ATTORNEYS

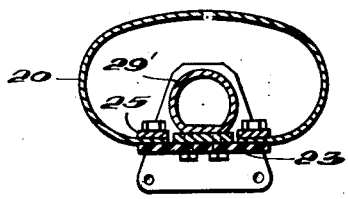
Fig. 5.
Fig. 6. Fig. 7.
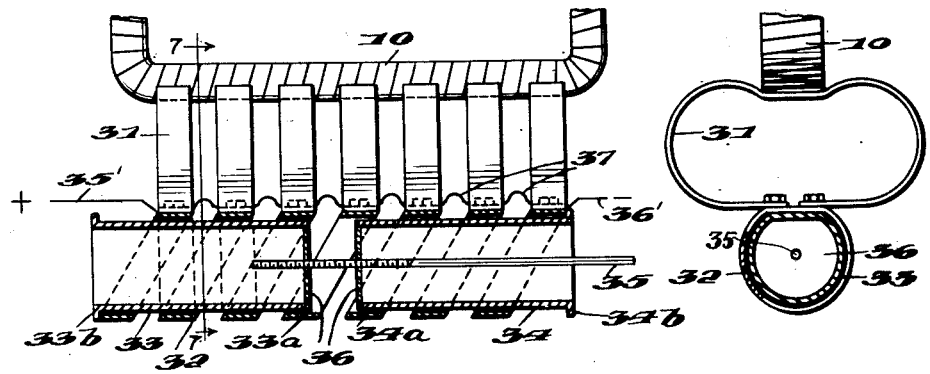
Fig. 8. Fig. 9.
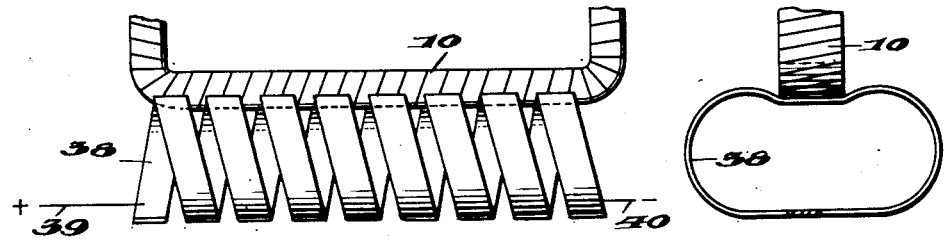

Patented Nov. 18, 1952

2,618,728

UNITED STATES PATENT OFFICE 2,618,728

APPARATUS FOR IRONING INSULATED COILS

Alfred Bräm, Schlieren, near Zurich, Switzerland, assignor to Micafil A.-G., Zurich-Altstetten, Switzerland, a joint stock company Application November 29, 1950, Serial No. 198,108
In Switzerland November 30, 1949

10 Claims. (Cl. 219—19)

The present invention relates to ironing machines and especially to machines adapted particularly for ironing insulating fabric material after its application as a covering for multi-turn conductor coils used in electrical motors, generators, transformers and the like.

The prior art machines heretofore designed for ironing the insulation material particularly over the straight portions of the wound coil between the end bends have not been entirely satisfactory. In one machine, heated inflexible tubes or rails are pressed by springs against the insulated conductor surface to be ironed and relative rotation obtained between the surface and ironing element. In another type of machine, stationary molds are used, the molds being sometimes heated and the straight insulated conductor part to be ironed being pressed into the mold by a loading weight and rotated by a suitable drive mechanism.

The prior art ironing machines all suffer from a major disadvantage in that the ironing elements are rigid bodies which are displaceable only at the points of suspension in a central direction. Particularly where very large coils are being made up, the conductors often twist or sag which results in an irregular outer surface contour that a rigid ironing element is unable to follow. Application of the ironing pressure is therefore distributed non-uniformly with respect to the surface and moreover is greatly increased in an undesirable manner at the edges of the multi-turn coil, the latter usually being rectangular in cross-section. The tangentially acting frictional force on the webs of insulation material wound on the coil is consequently insufficient. Moreover heating of the layers of insulating material is delayed when inflexible ironing elements are employed since the heat transfer path from the element to insulating material is for the most part limited to lines of contact therebetween instead of broad areal surfaces. Also should the straight portion of the coil to be ironed be mounted eccentrically, frictional forces in the reverse direction may even occur temporarily.

The principal object of the present invention is to provide an improved ironing machine which will overcome the above mentioned disadvantages to the end that all parts of the surface of the straight portion of the insulated coil will be reached by the ironing element and subjected to a substantially uniform pressure. In general, this desirable objective is attained by employing an ironing element which is resiliently deformable under pressure due to contact with the surface to be ironed, and which is also self-heating, being made of a material that is electrically conductive so that a current sufficient to heat the elements to proper ironing temperature can be passed through it.

A more specific object is to provide an improved ironing machine having an ironing element constituted by a thin-walled, resilient, electrically conductive curvilinear shoe which through deformation establishes an intimate, yielding pressure contact with the surface to be ironed upon relative rotation between the shoe and coil surface.

Another object is to provide an ironing machine of the class described wherein the ironing elements placed in pressure contact with the surface to be ironed are comprised of a plurality of rows of thin-walled, resilient, electrically conductive, curvilinear shoes arranged for pressure contact with different peripheral portions of the surface to be treated, the shoes of one row being displaced longitudinally in overlapping relationship with respect to the shoes of another row in such manner as will assure ironing of all portions of the surface upon relative rotation between the shoes and surface.

Still another object is to provide an ironing machine for the purpose indicated wherein the ironing element is constituted by a row of thin-walled, resilient, electrically conductive, curvilinear shoes arranged longitudinally of and parallel with the surface to be ironed in side-by-side relation, together with means for varying the distance between adjacent shoes in the row to accommodate coils of different lengths.

Yet another object is to provide an ironing shoe for a machine of the class described constituted by a relatively thin flat ribbon of resilient, electrically conductive material coiled into a helix, the spacing between adjacent turns of the helix preferably being made adustable to thereby vary the overall length of the shoe.

The foregoing objects and other advantages inherent in the invention will become more clear from the following detailed description of a few different constructions considered typical embodiments of the inventive concept hereinafter defined in the appended claims together with the accompanying drawings which illustrate such constructions. In the drawings:

Fig. 1 is a view in end elevation of an ironing machine embodying one form of the invention;

Fig. 2 is a view in perspective showing an axial portion of the improved ironing shoes employed in the Fig. 1 machine;

Fig. 3 is a view in side elevation of a modified construction for the ironing shoes and assembly thereof;

Fig. 4 is a vertical, transverse section on line 4—4 of Fig. 3;

Fig. 5 is a view similar to Fig. 4 illustrating a modified type of shoe support;

Fig. 6 is a side view partly in section and partly in elevation of a further embodiment of an assembly of ironing shoes in accordance with my invention;

Fig. 7 is a transverse sectional view of the construction shown in Fig. 6 taken on line 7—7 of Fig. 6 and;

Figs. 8 and 9 are views in the side and end elevations respectively of still another type of ironing shoe incorporating the principles of this invention.

With reference now to the drawings, each of the ironing elements shown in detail in Fig. 2 and in the assembly of Fig. 1, is comprised of relatively thin, resilient, electrically conductive metallic sheet material such as steel the opposite ends of which are rolled into confronting spaced relation to form a hollow shoe 2 preferably having a substantially elliptical configuration. The marginal portions 3 along each of the confronting edges of the rolled sheet are secured in parallel spaced relation to a common carrier plate 4 of electrically non-conductive material by means of electrically conductive pressure strips 5 and screws 6. Each shoe assembly is then secured by screws 7 in position upon a raised rib 8 extending radially inward from the interior surface of a tube 9 at opposite sides of the latter. The resilient, exterior curved surfaces of the two shoes 2—2', convex in the direction of the coil, thus extend inwardly toward the center of tube 9 and are adapted to exert pressure inwardly against opposite sides of the insulating web material 10 wound upon and covering the multi-turn coil 11, the individual turns of which are indicated at 12. The shoes 2 and 2' are arranged parallel to and preferably are coextensive in length with the straight portion of the coil which lies in a plane perpendicular to the plane of the drawing so that all portions of the coil surface will be brought into intimate contact with the shoes 2, 2', as the latter rotate about and in pressure contact with opposite sides of the coil surface 10.

In the illustrated embodiment, relative rotation between the coil and the ironing shoes is preferably obtained by maintaining the coil stationary and rotating the shoes about the periphery of the coil. The coil 11 is maintained stationary at the center of tube 9 by a coil support 13 at each end of the coil, the straight portion of the coil being slipped through a longitudinal gap 14 provided in the wall of tube 9 and provision is made for rotating tube 9 about its longitudinal axis in order to provide the necessary progressive pressure contact action by the resilient shoes 2, 2' over the entire periphery of the coil surface 10. To this end, the periphery of tube 9 is provided with teeth 15 which mesh with a plurality of circumferentially spaced driving pinions 16. In the interest of simplifying the drawings, the journal structure mounting tube 9 for rotating the tube on its axis has been omitted.

As clearly pictured in Fig. 1, the spatial arrangement of the shoes 2—2' with respect to the surface of coil 11 is such that that portion of the convex resilient curvilinear surface of the shoes in pressure contact with the surface of coil 11 at any instant will be deformed thus giving rise to an ironing pressure substantially equal to the restoring force built up in the shoe material, and which force serves to restore the temporarily deformed surface of the shoe to its original shape as the contact between the shoe and coil progressively changes due to the relative rotation therebetween. Moreover, because of this resiliency characteristic, the ironing pressure will remain substantially uniform throughout the entire area of peripheral contact about the coil. This is particularly important when ironing rectangularly cross-sectioned coils as shown in Fig. 1 since the pressure along the four longitudinal edges at the junction of the coil sides will be no greater than that applied to any other part of the coil surface. Also the inherent resilience of the shoe material enables the latter to conform itself to any irregularity in surface contour of the coil thus assuring that all surface areas of the coil will be pressure and heat treated.

As previously explained, the resilient material from which shoes 2—2' are made is also electrically conductive and hence provision is made to pass a current through the shoes to produce the ironing heat by the Joule's effect. For simplicity in illustration, the connecting wires from the shoes 2—2' to the source of current indicated by the conventional + and — symbols have been indicated schematically only by leads 17, 18 from conductive strips 5.

In the embodiment illustrated in Figs. 1 and 2, each of the shoes 2—2' is continuous in sheet form for the entire length of the straight portion of the coil to be ironed. Figs. 3 and 4 illustrate a modified construction where each ironing element is comprised of a row of closely spaced elliptical shoe bands, each band being relatively narrow in the direction of the longitudinal axis of the coil. As shown, the bands 20 of one row are displaced axially with respect to the bands 20' of the other row so as to bridge the gaps between adjacent bands on the latter. In this manner those portions of the coil surface not ironed by the row of shoe bands 20 will be ironed by the other row of shoe bands 20'.

Each of the shoe bands 20 and 20' is constituted by a narrow flat strip of relatively thin, resilient, electrically conductive metallic material the opposite ends of which are rolled into confronting spaced relation to form a substantially elliptical band. The confronting end portions 21, 22 of bands 20 are secured in parallel spaced relation to a common carrier plate 23 of electrically non-conducive material by means of screws 24 and pressure plates 25 which are preferably electrically conductive and hence also serve as bus bars for carrying current to the bands for connection of the latter in parallel, the manner of connection from the bars 25 to the source of current being indicated schematically only by conductor leads 26, 27. The carrier plate 23 can be supported for rotation about the conductor coil in the same manner as shown in Fig. 1 or, as illustrated in Fig. 4, can be secured to an adjustable supporting ring 29 located exteriorly of the bands 20. Alternatively the ring support 29' can be located interiorly of the bands 20 as shown in Fig. 5

The bands 20' of the other row are mounted in a similar manner, and with the double, axially displaced rows of bands 20, 20' illustrated, a relative rotation between bands and coil extending through 360° would be required to cover the entire surface of the straight portion of the coil as compared with the Fig. 1 arrangement wherein the two platen type shoes 2, 2' will cover the entire coil surface with only 180° of relative rotation between the two.

The length of the ironing element and its carrier should preferably be coextensive with the length of the straight portion of the conductor coil to be pressed so as to enable the coil surface to be ironed throughout its entire length at the same time. However since different types and sizes of coils have straight portions of different lengths, ironing elements of different lengths must be available. One way of solving the difficulty would be to have a different ironing element for each different length of coil to be pressed. A more economical arrangement would be to make the ironing element adjustable to various lengths so that the same element could be used with coils of different lengths.

One form of the invention wherein the length of the shoe is made adjustable is illustrated in Figs. 6 and 7. Here the ironing element is seen to be comprised of a plurality of relatively narrow elliptical bands 31 of basically the same construction and arrangement as shown in Figs. 3 and 4. However the carrier for the bands is constituted by a helix 32 supported upon sleeves 33, 34 with an adjustment screw spindle 35 to vary the length of the helix. Spindle 35 threads into end plates 36 secured at the inner end 33a, 34a of each sleeve, and the outer ends 33b, 34b of the sleeves are secured to the opposite ends of helix 32. The shoe bands 31 are arranged in a row in spaced parallel relation perpendicular to the axis of the helical carrier 32. Each band is secured to a different turn of the helix and hence all bands will be brought closer together or spread further apart as the helix is shortened or lengthened by rotating spindle 35. A plurality of the shoe assemblies each as shown in Fig. 6 could be assembled in substantially the same overlapping manner as the shoe assemblies of Fig. 3. Electrical connections to opposite ends of the bands 31 are indicated schematically only by leads 35', 36', jumpers 37 being provided between adjacent bands to carry the current from one band to the other.

Another type of multi-band ironing shoe adjustable in length is illustrated in Figs. 8 and 9, each turn of the helix establishing a band for contact with the coil surface. Here the shoe is seen to be comprised of a length of relatively thin, resilient, electrically conductive, metallic strip material coiled into a helix 38 having a substantially elliptical cross-section. The helical shoe 38 can be arranged substantially in the same manner as the helical support 32 of Fig. 6 in order that its length may be changed as necessary to accommodate different coil lengths. Conductors 39, 40 at opposite ends of the shoe 38 connected to a suitable source of electric power provide for flow of heating current through the helix from one end to the other. The helical shoe 38 would of course be mounted on a carrier (not shown) and brought into deforming pressure engagement with the coil surface to be ironed as in the other embodiments previously described.

In conclusion, the advantages inherent in the use of an electrically self-heating, resilient ironing shoe deformable to conform to the coil surface being ironed may be summarized as follows:

The relative soft, yielding application of the resilient shoes protects the corners of the coil being ironed against possible damage by overpressure and the force is applied to the coil surface in appreciably broad bands instead of along lines of pressure. Moreover, in cases where the coil is inaccurately centered, a counter sliding is prevented by the tangential yielding of the ironing shoes. The spring characteristic of the resilient ironing shoe is preferably not constant but rather is such that as the spring load increases the pressure of the shoe on the coil surface increases less rapidly.

The ironing shoes readily adapt themselves to every coil contour throughout the entire length of the coil to be ironed thus assuring uniform ironing of all areas of the coil surface, this despite the fact that certain portions of the coil surface may be twisted or sag or possess an irregular cross-section, or that the coil may be mounted eccentrically of the axis on which relative rotation between the coil and shoes is obtained.

Where the shoes are so constructed as to permit adjustment longitudinally of the coil, the length of the shoe can be made coextensive with the length of the straight portion of a particular coil to be ironed. Moreover, because the shoes are electrically self-heating, the need for extraneous heating devices is eliminated which is of especial advantage in cases where the length of the shoe is made adjustable. The broad, direct surface contact between the self-heated shoe and coil surface assures efficient heat transfer to the coil surface both by conduction and radiation. The ironing shoes being made of relatively thin material have a relatively low overall heat storage capacity with the result that temperature regulation becomes more rapid and the heating-up losses are relatively low.

The coil to be treated can be inserted between the ironing shoes very quickly and easily as compared with the much longer time required to set up coils in machines of the type employing loading weights that require removal, or ironing coil carriers that must be shifted. Differently sized coils can be ironed with the same ironing shoe if constructed in accordance with this invention whereas in other types of ironing machines a different size ironing element is often required for each coil size. In the mold type of machine utilizing a pressing weight, the weight must be decreased as the cross-section of the coil decreases, since if otherwise the weights would collide with the mold. And in the type of machine utilizing pairs of articulated ironing rails, the rail size must be suited to the size of coil being ironed to avoid collision between the rails.

It is to be understood that the various embodiments of this invention which have been described and illustrated are but typical of the many practical structural arrangements possible within the scope of the basic inventive concept disclosed and as hereinafter defined in the appended claims.

I claim:

1. In a machine for ironing the straight portion of an electrical coil to which an insulating covering has been applied, an ironing shoe constituted by a plurality of relatively thin-walled bands of resilient, electrically conductive material arranged for connection to a source of current for heating said bands, means mounting said bands in parallel spaced relation for engagement under pressure between the exterior sides of the bands and the coil covering, and means for obtaining relative movement between said bands and covering.

2. An ironing machine as defined in claim 1 and which further includes means for adjusting the spacing between adjacent bands thereby to effect an adjustment in the overall axial length of the shoe.

3. An ironing machine as defined in claim 1 wherein the means for mounting said bands includes a helical carrier, adjacent bands being carried by different turns of said helical carrier individual thereto, and means for adjusting the axial length of said helical carrier thereby to effect an adjustment in the spacing between said bands.

4. An ironing machine as defined in claim 3 wherein the means for adjusting the length of said helical carrier comprises a screw spindle rotatable in spaced plates secured to said helix.

5. An ironing machine as defined in claim 1 wherein said bands are substantially elliptical in cross-section.

6. An ironing machine comprising two shoes as defined in claim 1 the bands of each shoe being displaced axially with respect to the bands of the other shoe and bridging the gaps between adjacent bands of said other shoe.

7. In a machine for ironing the straight portion of an electrical coil to which an insulating covering has been applied, an ironing shoe constituted by a helix of relatively thin, resilient, electrically conductive strip material arranged for connection to a source of current for heating said material, means mounting said shoe for engagement under pressure between the exterior side of the shoe and the coil covering, and means for obtaining relative movement between said shoe and covering.

8. In a machine for ironing the straight portion of an electrical coil to which an insulating covering has been applied, an ironing shoe constituted by a plurality of thin-walled band-like members of resilient, electrically conductive material arranged for connection to a source of current for heating said members, said members being arranged in side-by-side spaced relation for engagement under pressure between the exterior sides of said members and the coil covering, and means for obtaining relative movement between said band members and covering.

9. An ironing machine as defined in claim 8 wherein said band-like members are structurally distinct and further including means mounting said members in said side-by-side relation.

10. An ironing machine as defined in claim 8 wherein said band-like members are constituted respectively by the turns of a helix of strip material.

ALFRED BRÄM.

REFERENCES CITED

The following references are of record in the file of this patent:

UNITED STATES PATENTS

| Number | Name | Date |
|---|---|---|
| 1,120,588 | Batten | Dec. 8, 1914 |
| 1,352,160 | Willard | Sept. 7, 1920 |
| 1,455,188 | Cox | May 15, 1923 |
| 1,697,134 | Neely | Jan. 1, 1929 |
| 1,880,770 | Burton et al. | Oct. 4, 1932 |
| 2,051,634 | Carroll et al. | Aug. 18, 1936 |
| 2,070,925 | Rolfs et al. | Feb. 16, 1937 |
| 2,379,220 | Englehart | June 26, 1945 |
| 2,393,058 | Pierce et al. | Jan. 15, 1946 |
| 2,502,147 | Grothouse | Mar. 28, 1950 |
| 2,502,148 | Grothouse | Mar. 28, 1950 |
| 2,504,146 | Mossin | Apr. 18, 1950 |

FOREIGN PATENTS

| Number | Country | Date |
|---|---|---|
| 497,254 | Germany | May 5, 1930 |